(12) United States Patent
Georges III

(10) Patent No.: US 7,924,430 B2
(45) Date of Patent: Apr. 12, 2011

(54) OPTICAL HETERODYNE FOURIER TRANSFORM INTERFEROMETER

(75) Inventor: James A. Georges III, Brighton, MI (US)

(73) Assignee: General Dynamics Advanced Information Systems, Fairfax, VA (US)

( * ) Notice: Subject to any disclaimer, the term of this patent is extended or adjusted under 35 U.S.C. 154(b) by 363 days.

(21) Appl. No.: 12/219,656

(22) Filed: Jul. 25, 2008

(65) Prior Publication Data

US 2009/0027686 A1 Jan. 29, 2009

Related U.S. Application Data

(60) Provisional application No. 60/935,102, filed on Jul. 26, 2007.

(51) Int. Cl.
*G01B 9/02* (2006.01)

(52) U.S. Cl. ........................................ 356/489

(58) Field of Classification Search ............... 356/484, 356/485, 489, 511, 512

See application file for complete search history.

(56) References Cited

U.S. PATENT DOCUMENTS

| | | | |
|---|---|---|---|
| 4,305,666 A | 12/1981 | Becherer et al. | |
| 5,828,454 A | 10/1998 | Gust | |
| 6,078,392 A | 6/2000 | Thomas et al. | |
| 6,229,614 B1 | 5/2001 | Larsen | |
| 6,525,821 B1 | 2/2003 | Thomas et al. | |
| 6,734,978 B2* | 5/2004 | Adachi | 356/512 |
| 6,747,771 B2 | 6/2004 | Thomas et al. | |
| 6,999,178 B2 | 2/2006 | Hanson et al. | |
| 7,002,691 B2 | 2/2006 | Thomas et al. | |
| 7,019,839 B2 | 3/2006 | Szafraniec | |
| 7,068,375 B2 | 6/2006 | Voelkl | |
| 7,116,425 B2 | 10/2006 | Hanson et al. | |
| 7,119,905 B2* | 10/2006 | Bingham et al. | 356/484 |
| 7,298,532 B2 | 11/2007 | Thomas et al. | |
| 7,312,875 B2 | 12/2007 | Hanson et al. | |
| 7,349,100 B2 | 3/2008 | Hanson et al. | |
| 2005/0094157 A1* | 5/2005 | Arieli et al. | 356/512 |
| 2006/0192972 A1 | 8/2006 | Bingham et al. | |

FOREIGN PATENT DOCUMENTS

| | | |
|---|---|---|
| JP | 2006-116028 | 5/2006 |
| JP | 2006-196555 | 7/2006 |

OTHER PUBLICATIONS

PCT International Search Report, dated Jan. 31, 2009.

* cited by examiner

*Primary Examiner* — Michael A Lyons
(74) *Attorney, Agent, or Firm* — Ingrassia Fisher & Lorenz, P.C.

(57) ABSTRACT

An interferometer and method for interferometric analysis are provided. The methodology includes generating first and second light beams from a light source, interacting the first light beam with an object under inspection, forming, from light emanating from the object under inspection in response to the interacting, an image of the light source on an image sensor, projecting the second light beam on the image on the image sensor, the combination of the light emanating from the object under inspection and the second light beam forming a collective image on the image sensor, applying a Fourier transform to the collective image formed on the image sensor, thereby forming a phase image, and isolating a wavefront map of the object under inspection from within the phase image.

20 Claims, 18 Drawing Sheets
(1 of 18 Drawing Sheet(s) Filed in Color)

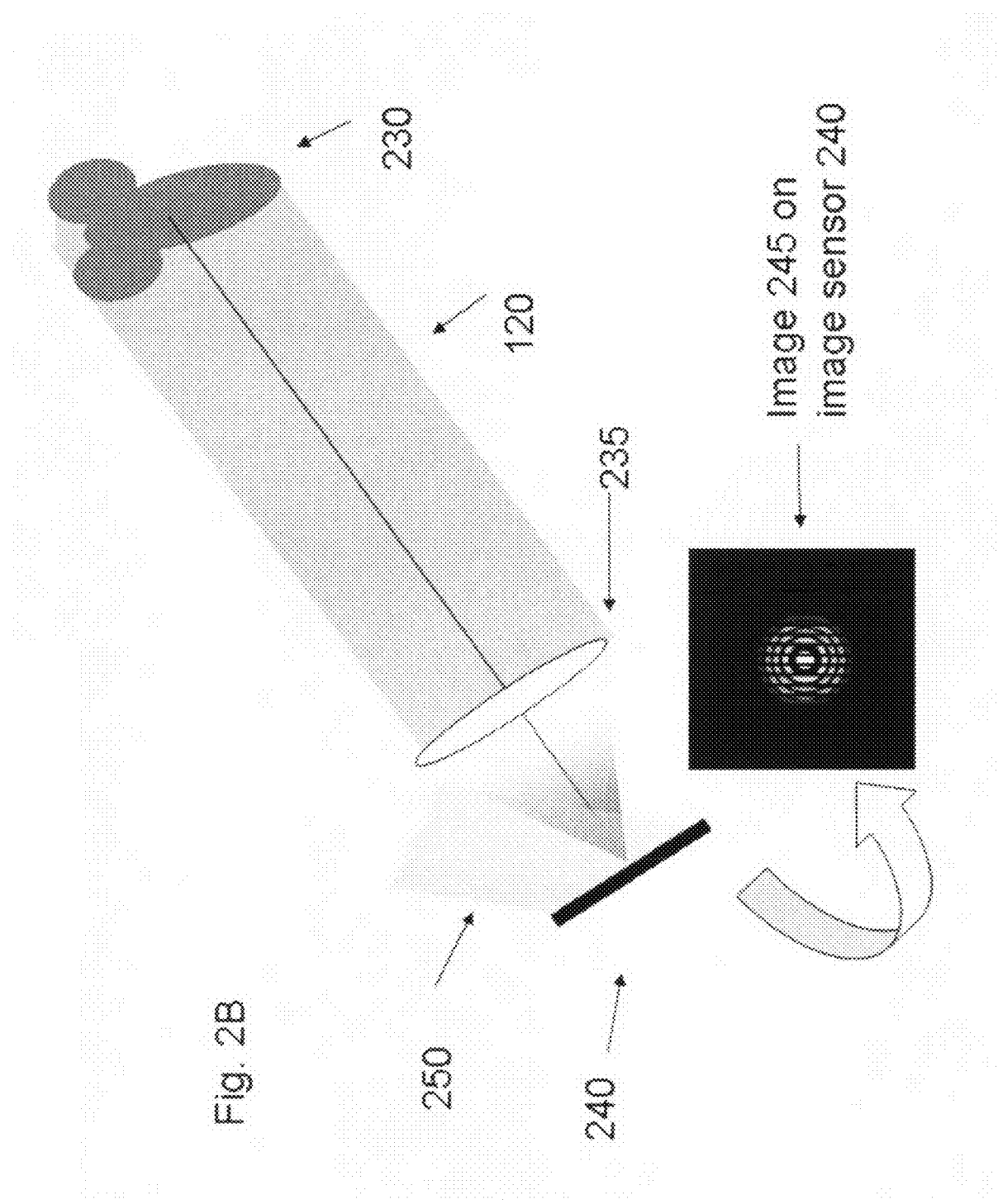

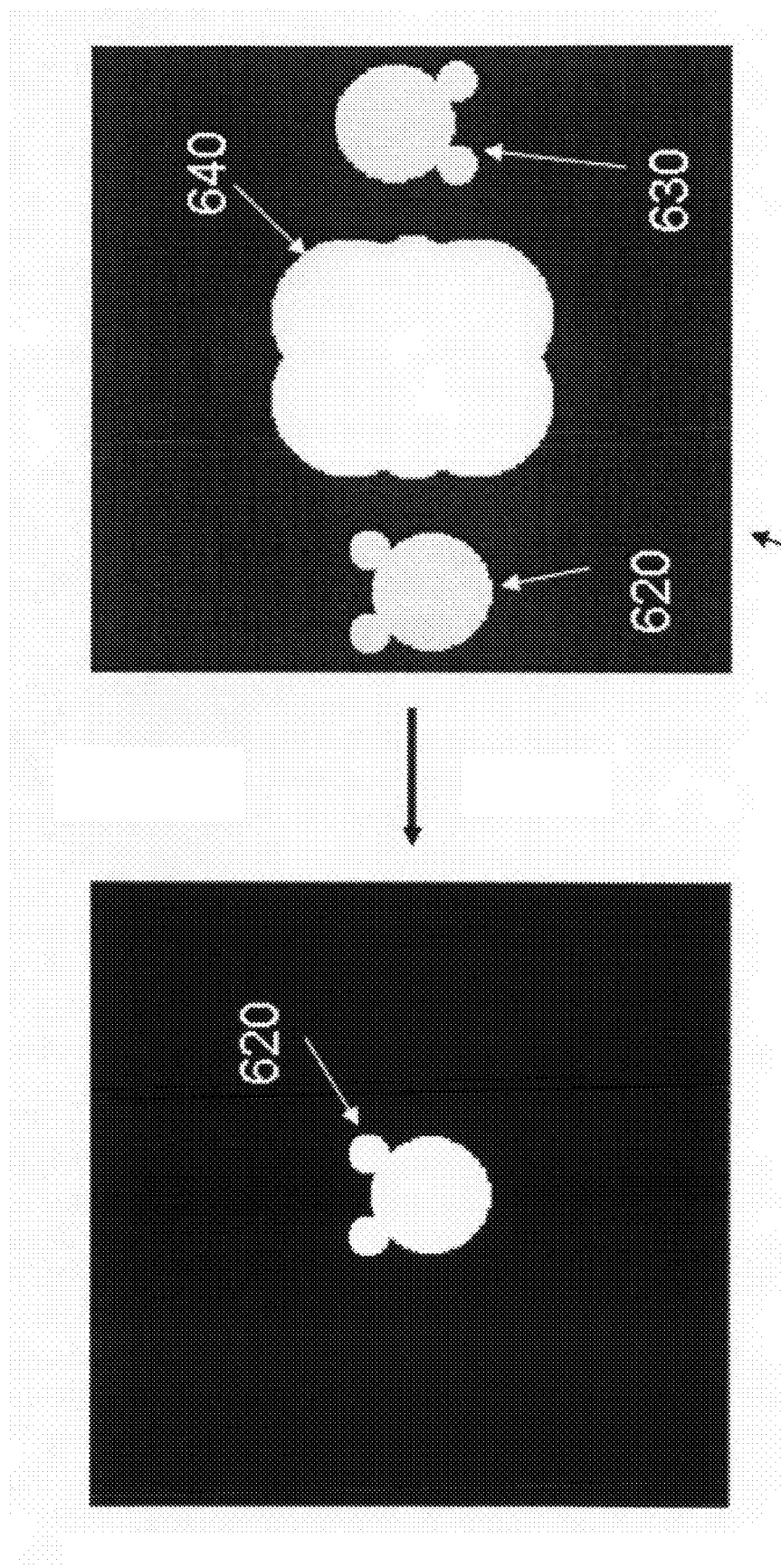

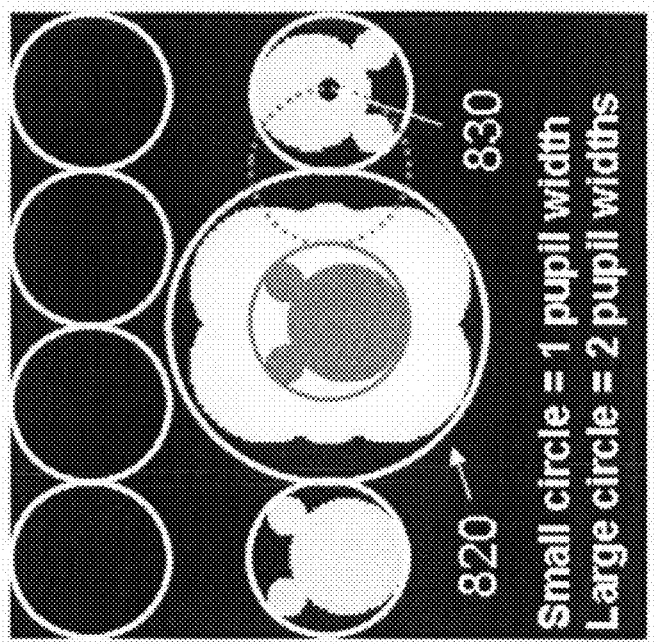
Fig. 8
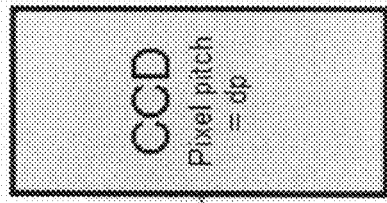
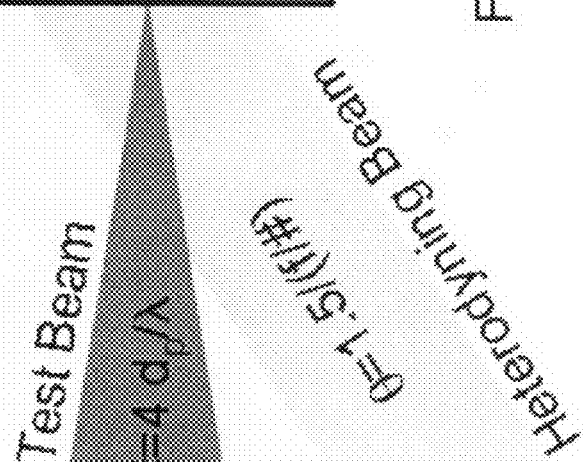
Fig. 7

Heterodyne Beam 1 Path

Heterodyne Beam 2 Path

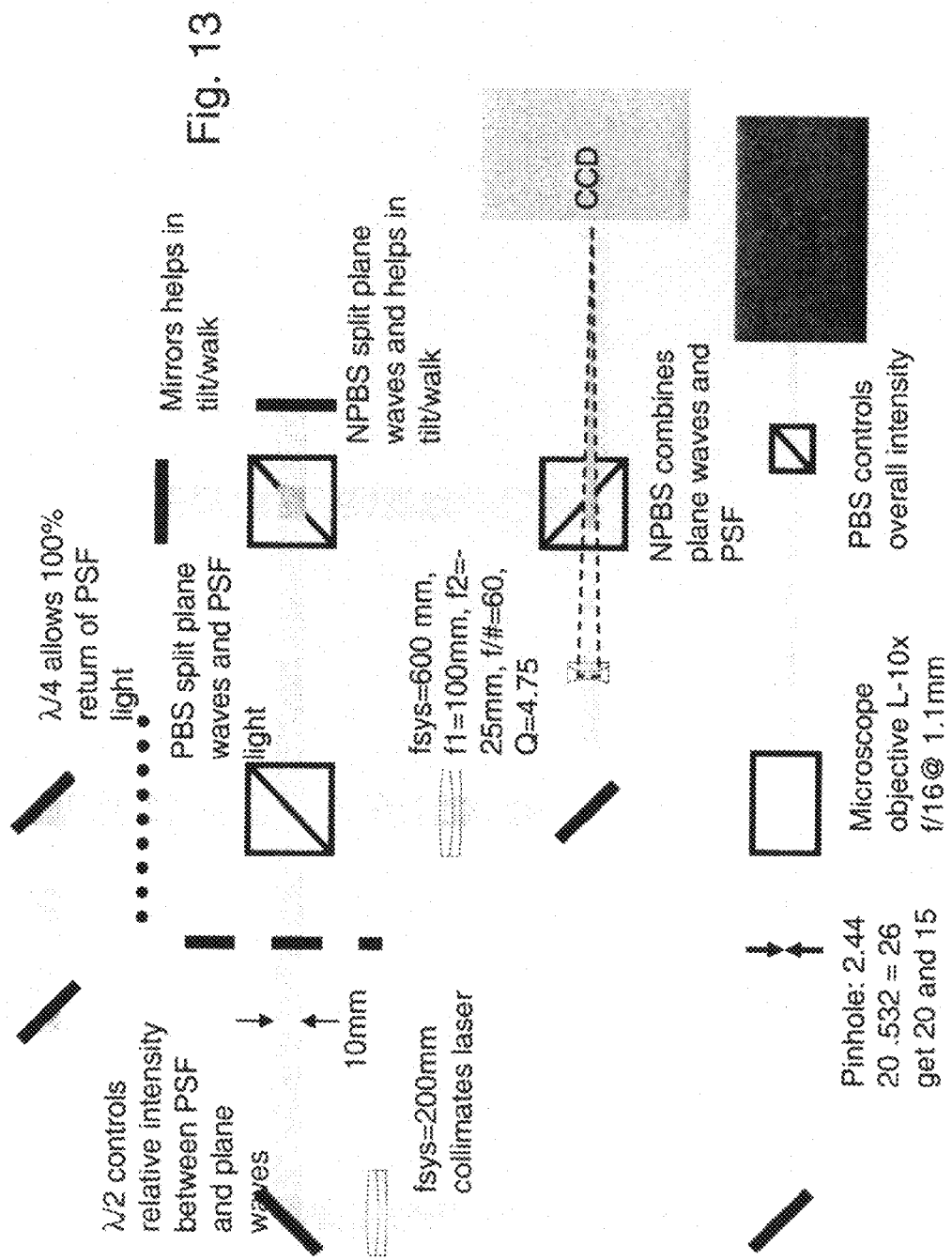

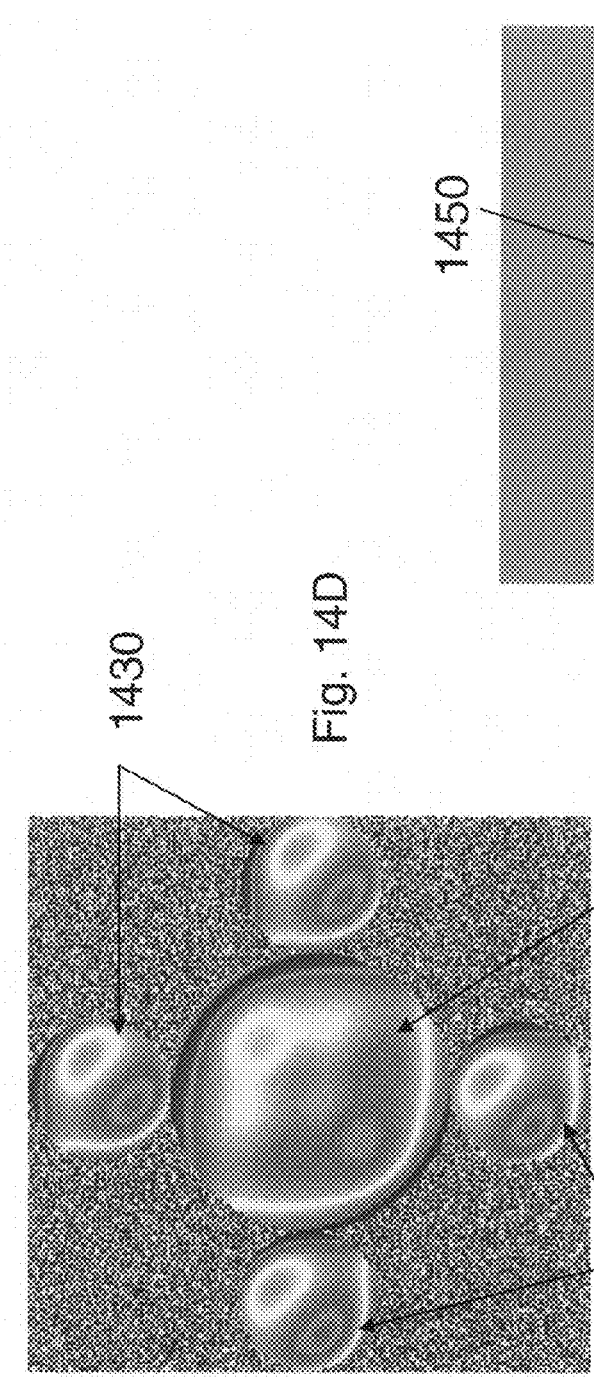
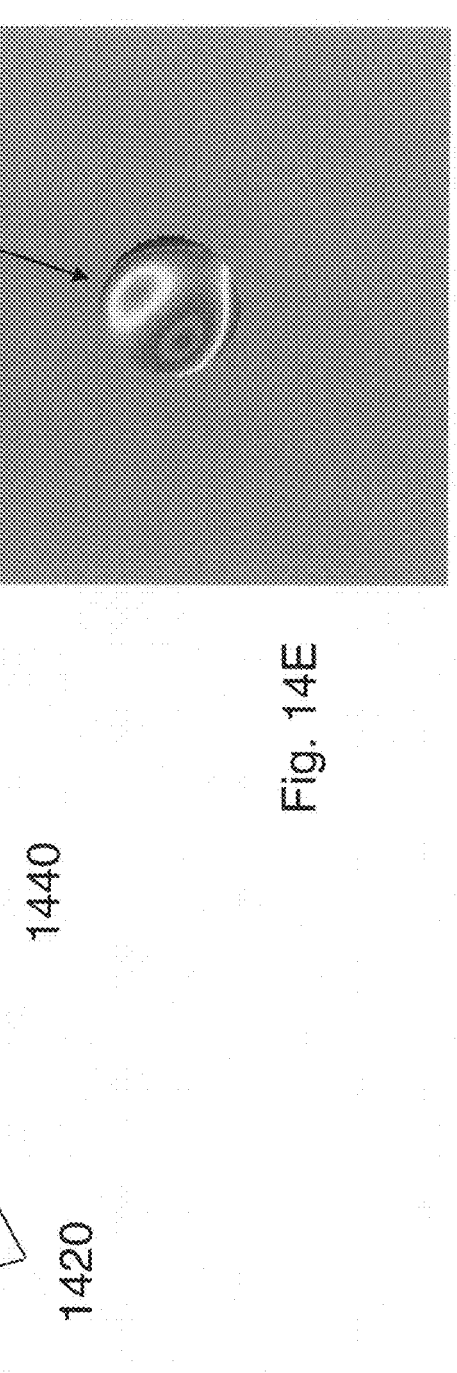
Fig. 14D
Fig. 14E

OPTICAL HETERODYNE FOURIER TRANSFORM INTERFEROMETER

CROSS-REFERENCE TO RELATED APPLICATION

The benefits of Provisional Application No. 60/935,102 filed Jul. 26, 2007 are claimed under 35 U.S.C. §119(e), and the entire contents of this application are expressly incorporated herein by reference thereto.

BACKGROUND OF THE INVENTION

1. Field of the Invention

The present invention relates to a technique for analyzing the optical characteristics of an object under consideration. More specifically, the present invention relates to interferometer analysis.

2. Discussion of Background Information

Interferometers are used to measure optical characteristics (such as the contours and depth of a surface) of objects such as mirrors and lenses that transmit and/or reflect light. Interferometers typically examine wave fronts of light reflected by or transmitted from an object to generate wave front maps of the object under inspection. One class of interferometers combines an image of the object under inspection with a spatial heterodyne beam to map "fringes" onto the object under inspection and retrieving wavefronts using a Fourier filtering processes. This process is known as SHIFT.

The fundamentals of SHIFT based interferometry is shown in FIG. 1, in which an incoming light beam 110 from a point source 105 and collimating lens 107 is incident on an object under inspection 115, in this case a mouse-shaped mirror. The reflected light beam 120 is made incident (either by the object 115 under inspection alone or with additional optics such as focusing lens 130) on an imaging sensor 125, such as a CCD. As shown in the rotated view of the imaging sensor 125, an image of object under inspection 115 is formed on the surface of the imaging device. This image will be combined with an angular heterodyne beam 150 for subsequent interferometric analysis.

Typical monochromatic or snapshot interferometers have no reference or zero plane, and thus rely upon relative calculations as opposed to absolute calculations. Thus, such an interferometer will be able to conduct a relative measurement of two adjacent points on a surface to detect a discontinuity. However, because there is no reference plane, the interferometer cannot detect in which direction the discontinuity leads. For example, if the object under inspection had the shape of upward stairs, the interferometer could recognize that each step represented a discontinuity relative to adjacent steps, but would not know if any particular step was an upward step or a downward step.

To overcome this problem, so-called phase shifting interferometers were developed. These interferometers would examine an object under inspection from several different vantage points, often referred to as a push/pull process. At each vantage point, the discontinuity in the object under inspection would present a different wave front to the interferometer. By analyzing the different wave fronts from the different vantage points, the phase shifting interferometers could effectively identify both the discontinuity and its direction. A drawback of these systems, however, was that each of the additional measurements (taken at different points in time) was individually subject to the effects of ambient noise (e.g., vibrations) that would be different from one measurement to the next.

Efforts have been made to overcome the above drawbacks by creating a hologram that allows for the various measurements to be taken at the same time but at different points in space. The multiple optical observations are then performed electronically from the hologram without the injection of outside temporal noise. However, the examination and analysis is all based on the image of the object under inspection. Also, even though only one snapshot is taken of the object under inspection, the analysis still requires examination of that snapshot from four physical spaces.

Collections of objects that imitate a larger unitary object present more complex obstacles. One known example of this is the James Webb telescope under construction for orbital deployment to supplement the Hubble program. The diameter of the reflective mirror for this telescope is several times larger than that used by Hubble, thus providing it with much greater capabilities than Hubble. Since a single mirror of this size cannot be launched into space with current space platforms, the mirror is being constructed of smaller abutting hexagonal mirrors that will collectively operate akin to a single large mirror. In such a system, accuracy of alignment of the discrete elements is paramount, but presents challenges.

Specifically, interferometric measurements generate fringe patterns on the object under inspection. FIG. 3A shows such fringe patterns on a hexagonal object under inspection. However, when dealing with adjacent elements, the fringe patterns may be out of alignment such as shown in FIG. 3B. It is unclear whether fringe line 310 aligns with any of fringe lines 320, 330, 340, etc. Known methods for addressing this ambiguity essentially rely upon application of an independent algorithm to the analysis, but this algorithm produces only a "best guess" with questionable accuracy absent providing additional light sources and inducing resulting complications to the instrument.

SUMMARY OF THE INVENTION

According to an embodiment of the invention, a method for interferometric analysis is provided. The method includes generating first and second light beams from a light source; interacting the first light beam with an object under inspection; forming, from light emanating from the object under inspection in response to the interacting, an image of the light source on an image sensor; projecting the second light beam on the image on the image sensor, the combination of the light emanating from the object under inspection and the second light beam forming a collective image on the image sensor; applying a Fourier transform to the collective image formed on the image sensor, thereby forming a phase image; and isolating a wavefront map of the object under inspection from within the phase image.

The above embodiment may have various features. The second light beam may be at an angle to the first light beam. The angle is preferably sufficiently large such that, within the phase image, the wavefront map of the image does not overlap with any other wavefront image, and sufficiently small such that, within the phase image, the entire wavefront map of the image is within the phase image. The angle is preferably such that, for a diameter of a circle that encloses the object under inspection in pupil space, then the source of the heterodyne beam is positioned in pupil space at a distance of 1.5 diameters from the center of the diameter of the object under inspection. There may be a step of converting, between the generating and the projecting, the second light beam into at least one heterodyne light beam, such that the projecting comprises projecting the heterodyne light beam on the image on the image sensor. The at least one heterodyne beam may be at an angle to the first light beam. There may be a step of determining whether the captured image has sufficient coherency and fringe contract to differentiate fringe patterns from ambient noise. The image of the light source on the image sensor may account for any modifications due to at least intervening optics between the light source and the image sensor.

According to another embodiment of the invention, a method for interferometric analysis is provided. The method includes generating first and second light beams from a light source, interacting the first light beam with an object under inspection, forming, from light emanating from the object under inspection in response to the interacting, an image of the light source on an image sensor, converting, between the generating and the projecting, the second light beam into a plurality of heterodyne light beams, projecting the heterodyne light beams on the image on the image sensor, the combination of the light emanating from the object under inspection and the heterodyne light beams forming a collective image on the image sensor, applying a Fourier transform to the collective image formed on the image sensor, thereby forming a phase image containing at least a plurality of wavefront maps of the object under inspection, isolating a plurality of wavefront maps of the object under inspection from within the phase image, and generating a final wavefront map of the object under inspection based on the plurality of wavefront maps.

The above embodiment may have various optional features. Each of the heterodyne light beams may be at an angle to each other and to the first light beam. The angle may be sufficiently large such that, within the phase image, the wavefront map of the image does not overlap with any other wavefront image and sufficiently small such that, within the phase image, the entire wavefront map of the image is within the phase image. The method may include a step of determining whether the captured image has sufficient coherency and fringe contract to differentiate fringe patterns from ambient noise. The image of the light source on the image sensor may account for any modifications due to at least intervening optics between the light source and the image sensor.

According to still another embodiment of the invention, an interferometer system configured to generate a wavefront map of an object is provided. The system includes a light source, an image sensor, and an optical system. The optical system is configured to direct a first light beam from the light source onto the object, direct light interacting with the object on the image sensor, convert a second light beam from the light source into at least one heterodyne beam, and direct the at least one heterodyne beam onto the image sensor. The image sensor is disposed in the plane in which an image of the light source as modified by the optical system and the object will be in its best focus preferably within plus or minus one depth of focus. The image of the light source and the heterodyne beams form a collective image on the image sensor.

The above embodiment may have a combination of software and hardware configured to apply a Fourier transform to the collective image formed on the image sensor, thereby forming a phase image, and isolate a wavefront map of the object under inspection from within the phase image. The combination of software and hardware may also be configured to determine whether the captured image has sufficient coherency and fringe contract to differentiate fringe patterns from ambient noise.

According to yet another embodiment of the invention, an interferometer system configured to generate a wavefront map of an object is provided. The system includes a light source, an image sensor, and an optical system. The optical system is configured to direct a first light beam from the light source onto the object, direct light interacting with the object on the image sensor, convert a second light beam from the light source into a plurality of heterodyne beams, and direct the plurality of heterodyne beams onto the image sensor. The image sensor is disposed in the plane in which an image of the light source as modified by the optical system and the object will be in its best focus preferably within plus or minus one depth of focus. The image of the light source and the heterodyne beams form a collective image on the image sensor.

The above embodiment may have a combination of software and hardware configured to apply a Fourier transform to the collective image formed on the image sensor, thereby forming a phase image containing at least a plurality of wavefront maps of the object under inspection, isolate a plurality of wavefront maps of the object under inspection from within the phase image, and generate a final wavefront map of the object under inspection based on the plurality of wavefront maps. The combination of software and hardware may also be configured to determine whether the captured image has sufficient coherency and fringe contract to differentiate fringe patterns from ambient noise.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is further described in the detailed description which follows, in reference to the noted plurality of drawings by way of non-limiting examples of certain embodiments of the present invention, in which like numerals represent like elements throughout the several views of the drawings, and wherein:

FIGS. 2A and 2B illustrate an overview of interferometric methodology of an embodiment of the invention;

FIGS. 6A and 6B show a phase image and a wave front map (phase data omitted for clarity) respectively based on the presence of a single heterodyne beam.

FIG. 7 shows a preferred mathematical relationship between the parameters of the test beam and image sensor.

FIG. 8 shows a preferred spatial relationship in pupil space between the image of the object under inspection and the source of the heterodyne beam.

FIG. 13 shows another embodiment of an interferometer according to the invention.

FIGS. 14A-14E show various views of an interferometric analysis of a circular mirror.

DETAILED DESCRIPTION OF EXEMPLARY EMBODIMENTS

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
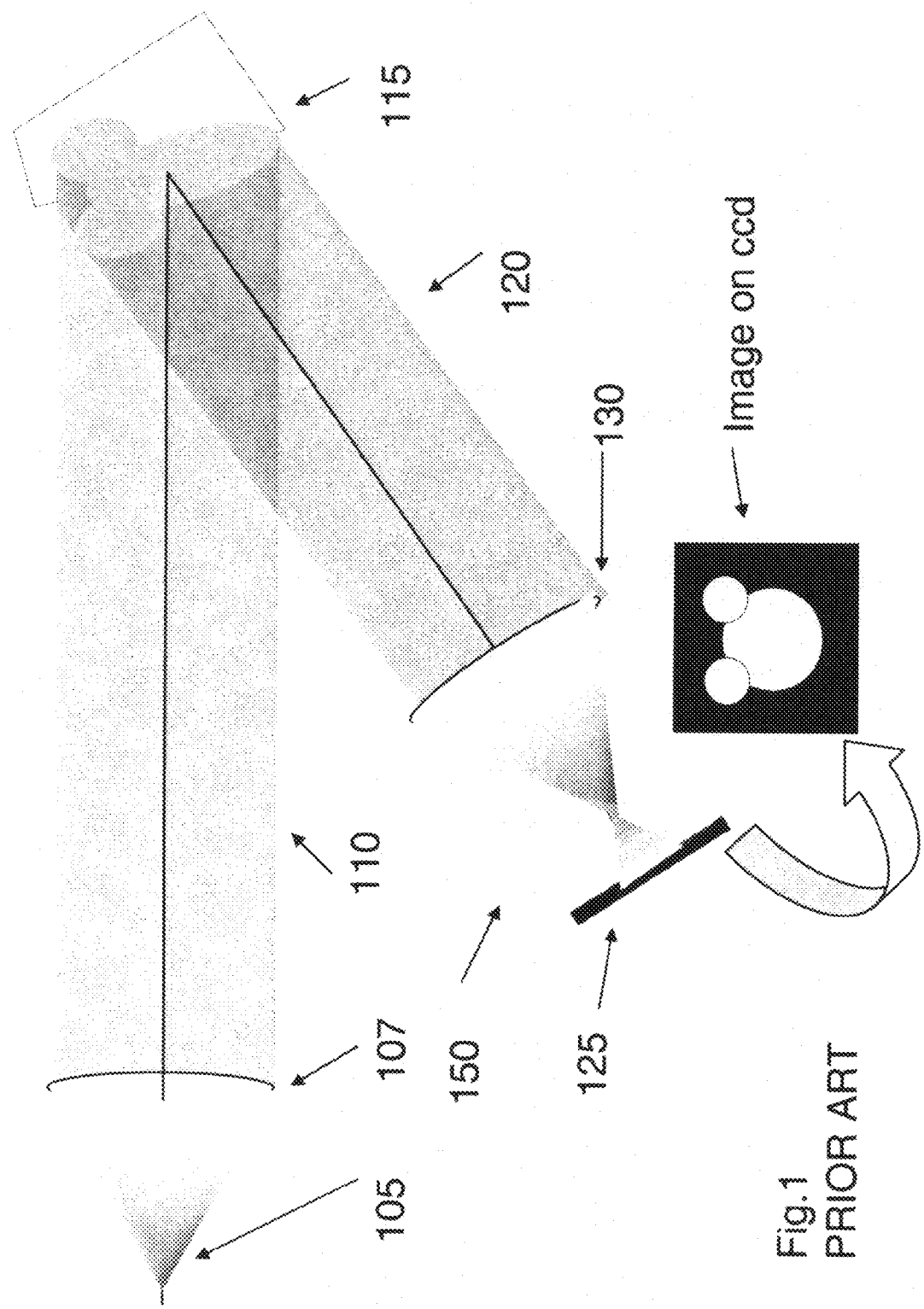
FIG. 1 illustrates an overview of interferometric methodology of the prior art.
Figure 2A:
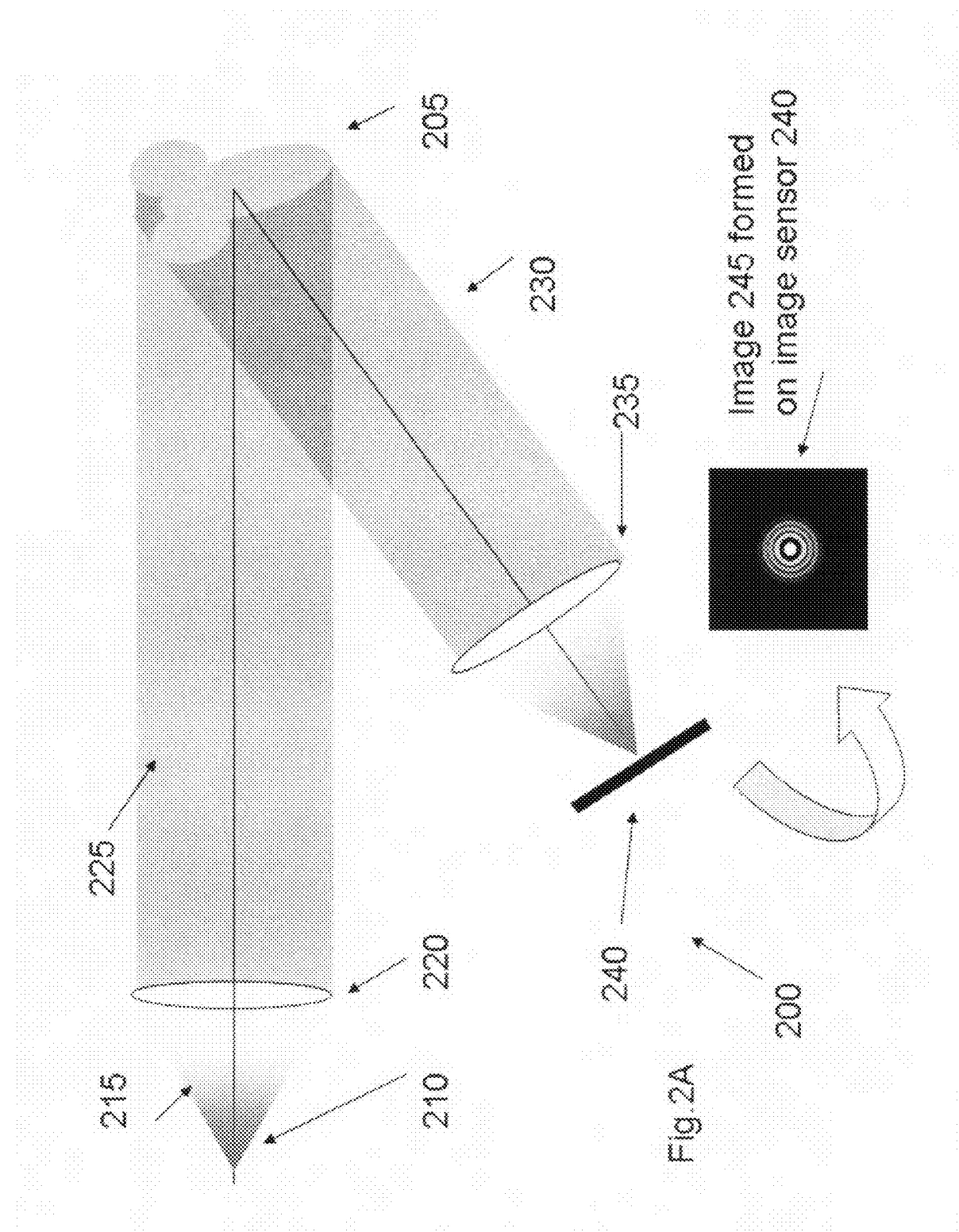
Figure 3B:
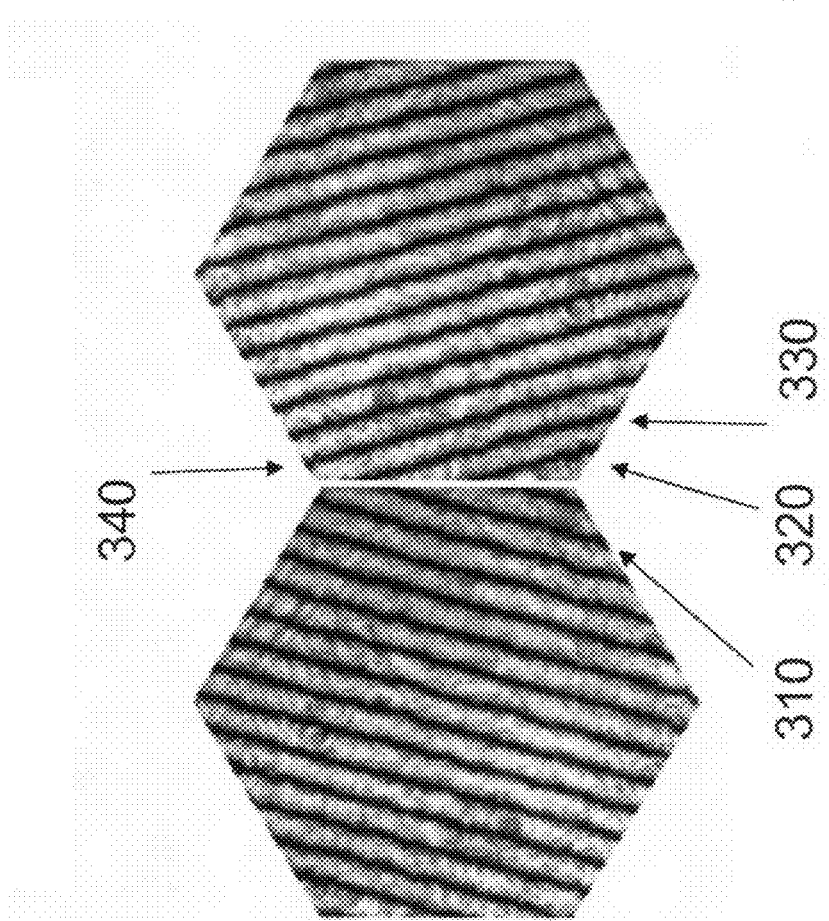
FIGS. 3A and 3B show uniform and non-uniform wave front maps of a hexagonal object under inspection.
Figure 3A:
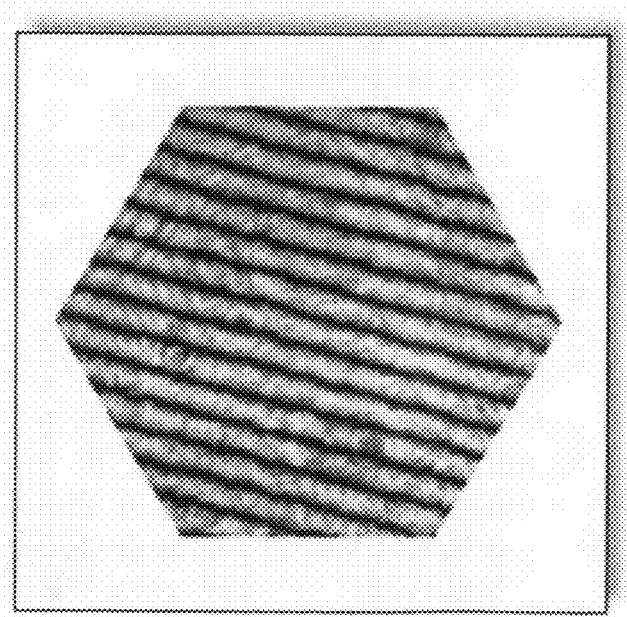

FIGS. 2A and 2B shows an embodiment of an interferometer 200 for interferometric analysis of an object under inspection 205. ("Object" as used herein refers to both the singular individual objects and the plural, such as collections of objects.) A point light source 210 emanates spherical waves of light 215 toward a collimating lens 220, which converts light 215 into planar (flat) waves 225. Planar light waves 225 then interact (transmits and/or reflects with object under inspection 205) before the resulting light waves 230 move toward image sensor 240. Object under inspection 205 may have any shape, and be reflective, transparent and/or translucent. In FIGS. 2A and 2B, object under inspection 205 is a mouse-shaped mirror for illustrative purposes, such that the interaction would be reflection and the resulting light 230 would be reflected light.

The resulting light 230 is ultimately incident on image sensor 240. Image sensor 240 is positioned in the image plane of the interferometer 200, i.e., the plane in which an image of light source 210 as modified by the intervening optical elements and the object under inspection 205 will be in its best focus preferably within plus or minus one depth of focus. Object under inspection 205 may be able to form such an image on its own (e.g., a concave mirror), but most likely additional optics 235 upstream and/or downstream of the object under inspection 205 will be needed (only downstream elements are shown in FIGS. 2A and 2B). The resulting image 245 represents the light point source 210 as modified by object under inspection 205 and the optics of the interferometer.

The resulting image 245 formed on image sensor 240 represents a significant difference between the above embodiment and the prior art. As noted above, prior art systems rely upon an image of the object under inspection, whether in two dimensions on an image sensor or in a three-dimensional hologram. In the noted embodiment, it is image 245 of the point light source 210 which will be processed for interferometric analysis.

Figure 4B:
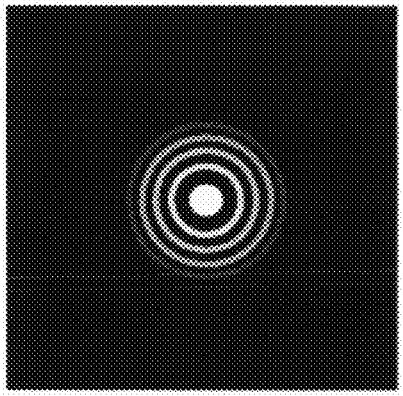
FIGS. 4A-4D show the images formed on the image sensor of the prior art and the embodiments of FIG. 2A, respectively.
Figure 4D:
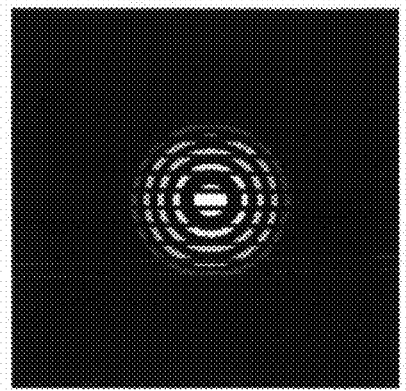
Figure 4A:
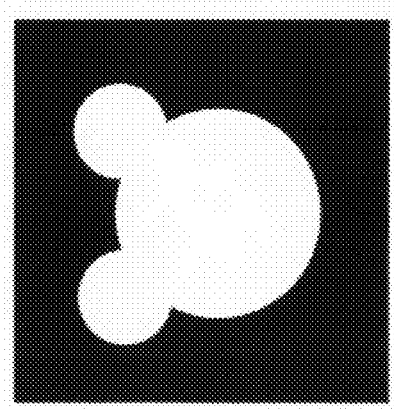
Figure 4C:
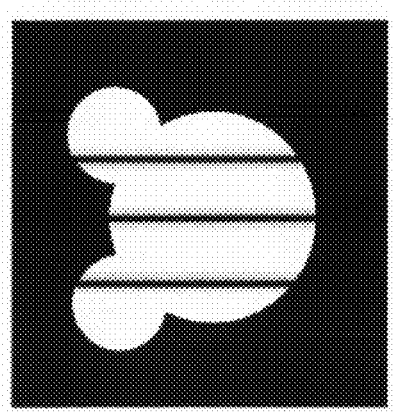

The distinction is illustrated in FIGS. 4A and 4B. FIG. 4A shows the image that a prior art system would form on the image sensor for a mouse-shaped mirror. FIG. 4B shows how the embodiment of FIG. 2 forms a different image of light source 210 for the same mouse-shaped mirror. (Image 4B is effectively equal to the square of the absolute value of the Fourier transform of the image in 4A.) FIGS. 4C and 4D show how these formed images combine on the image sensor 240 with the heterodyne beam 250.

Referring now to FIG. 2B (in which certain elements of FIG. 2A have been removed for clarity), a heterodyne light beam 250 is made incident on image sensor 240. The size and shape of beam heterodyne light beam 250 preferably covers the entire sensor 240, although in theory smaller beams could be used provided that it is supported by optical sampling. Light beams 230 and 250 arrive coherently so that they properly interfere. The angle of heterodyne light beam 250 is based on a variety of factors, discussed more fully below.

Figure 5:
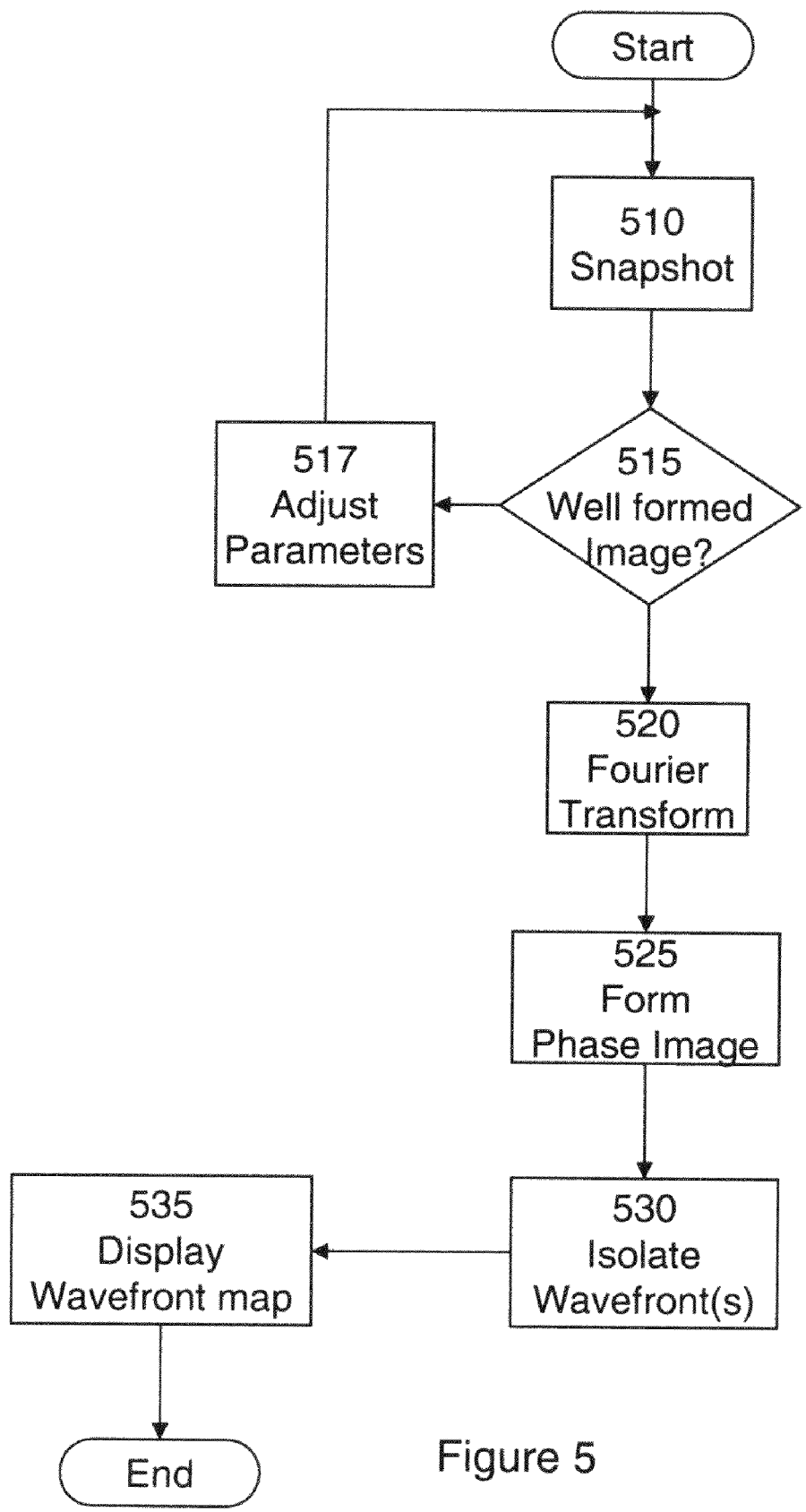
FIG. 5 is a flowchart showing the processing steps of the image formed on the image sensor in an embodiment of the invention.

Referring now to FIG. 5, at step 510, the system captures a snapshot of the incoming light beams 230 and 250 as incident on image sensor 240. At step 515, the resulting captured image is tested to determine whether a well-formed image is formed. A well-formed image is an image with a high fringe contrast due to beams 230 and 250 arriving coherently. The level of coherency and fringe contrast need only be to a degree sufficient for interferometer 200 to effectively differentiate the fringe patterns from ambient noise, which differs from interferometer to interferometer. If not, at step 517 the system parameters are adjusted (e.g., adjusting the relative intensity or optical path difference of light 225 and 250) and control returns to steps 510 for another snapshot.

At step 520, the captured image is subject to a two (2) dimensional Fourier transform. Each pixel (or other subpoint of data for the image) of the original image will therefore generate a corresponding real and imaginary number; the collection of all real numbers forms a real image, and the collection of all the imaginary numbers forms a imaginary image. It is not necessary to display the resulting real or imaginary images, but it may be desirable for diagnostic or other test purposes.

At step 525, a phase image is formed by processing the real and imaginary number for each pixel of the transformed image per the formula acrtan (i/r). Several available computer products such as MATLAB are already programmed with this functionality and can be used.

Referring now to FIGS. 6A-6B, within the resulting phase image 610 will be found a wave front map 620 of the object 205 under inspection, its complex conjugate 630, and a silhouette of the optical transfer function ("OTF") 640 of the optic under inspection 205. For ease of discussion, the phase date is omitted, only showing the images in black and white. The wave front map 620 is the information of interest. At step 530, the wave front map is at least partially isolated from the remainder of phase image 610 and displayed at step 535. This can be as simple as zooming in on the outline or using known software to extract/copy the image of interest from the background, such as shown in FIG. 6B. The wave front map 620 will be a highly accurate wave front map of the object under inspection 205 to within one wavelength of the incident light. Applicants refer to this process as "OSHIFT."

To create the above phase image 610, the heterodyne beam preferably is incident at either a specific angle or range of angles. Specifically, the position of wave front map 620 relative to OTF 640 is dependent upon the angle of heterodyne beam, in that the two will be closer together for a smaller angle and farther apart for a larger angle. The minimum angle is the angle at which the map 620 would be adjacent to OTF 640 without overlap; if the angle were any smaller, map 620 and OTF 640 would overlap with corrupted results in the overlap region. The maximum angle is the angle at which the map 620 would be adjacent to the outer edge of phase image 610; if the angle were any larger, part of map 620 would be cut off and the desired data therein would be lost.

More particularly, if a "pupil width" is defined by the diameter of a circle that encloses the object under inspection 205 in pupil space, then the source of the heterodyne beam is positioned in pupil space at a distance of 1.5 pupil widths from the center of the pupil width of the object 205 under inspection. This can be seen for example in FIG. 8A, in which the circle 810 encircles object under inspection 205, and the source of the heterodyne beam 250 is a distance of 1.5 pupil widths from the center of circle 810. The reason is that the object 205 under inspection will create an OTF that is two pupil widths in diameter, while the heterodyne beam itself will generate a copy of the object under inspection 205 that is one pupil width in diameter. Placing the source of heterodyne beam 250 at the noted angle will ensure no overlap between the two. The mathematical basis for the same is discussed in more detail below.

Figure 6C:
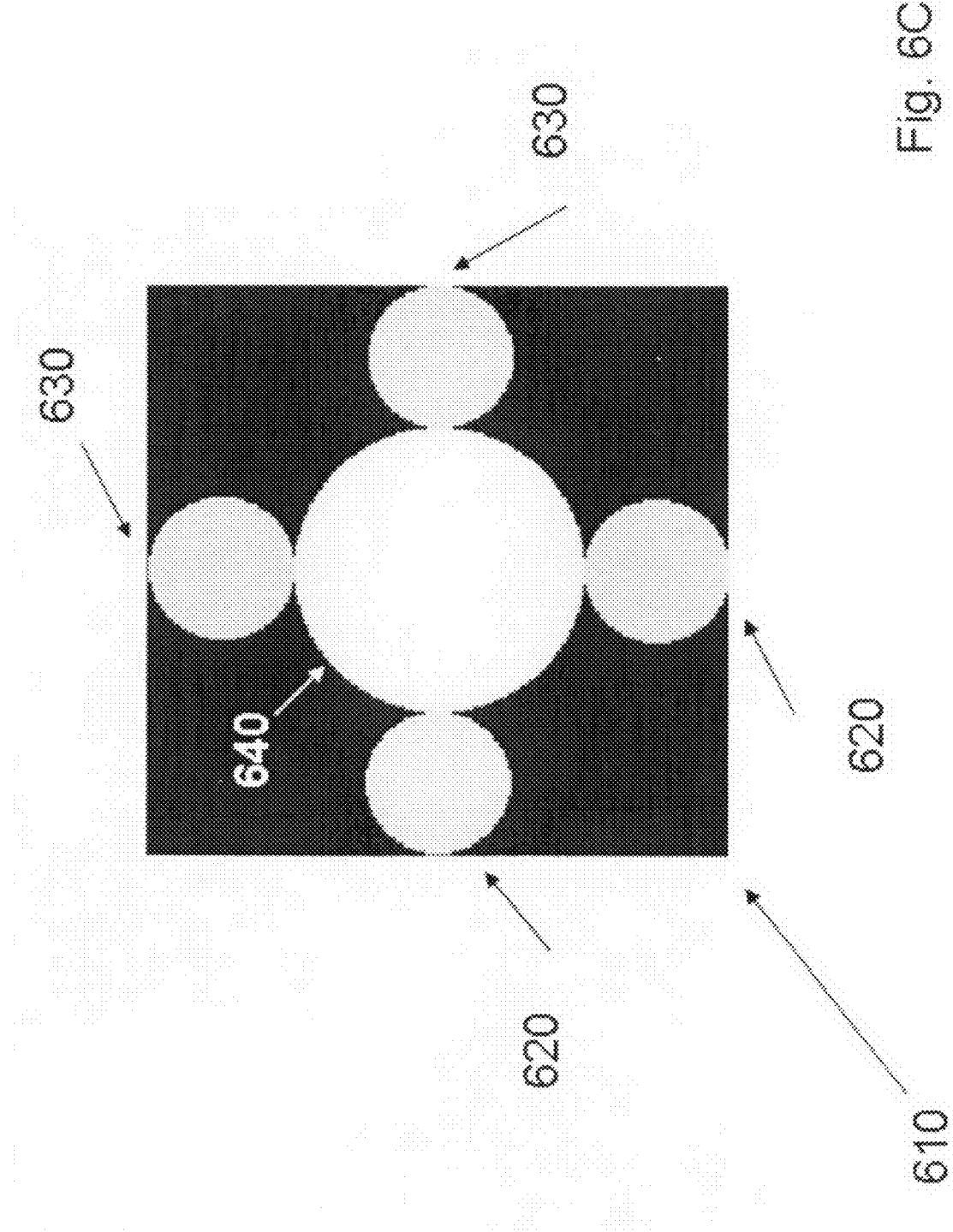
FIG. 6C shows a phase image (phase data omitted for clarity) based on the presence of two heterodyne beams.

Multiple heterodyne beams 250 may be made incident on the image sensor 240 from different points of origin. The processing is the same as in FIG. 5, save that the resulting plane image at step 525 will include a different outline/conjugate pair 620/630 for each heterodyne beam 250. At step 530, the multiple 620 of the object under inspection 205 and the contents within are at least partially isolated from the remainder of the phase image 610. The contents of each outline 720 is then combined through known techniques (e.g., averaging, weighted averaging, discarding the worst image, etc.) which reduces the potential effects noise and aids in phase unwrapping on any individual image. The resulting combined wave front map will be a highly accurate map of the object under inspection 205 to within one wavelength of the incident light 225. FIG. 6C shows the phase image 610 for a circular mirror with two heterodyne beams (again, phase data is omitted for clarity).

The incoming angle of any heterodyne beam must comply with the specific beam requirements as set forth above. When using multiple beams, the incoming beam angles must also be set such that none of the maps 620 within plane image 610 overlaps, else the contents would provide corrupted data. To avoid this overlap, any incoming heterodyne beams 250 must not overlap in autocorrelation space with any other heterodyne beam or its conjugate.

As the variations of the object under inspection 205 will be on the order of nanometers, use of any color light for heterodyne beam 250 would be appropriate. However, if for any reason the variations would be large enough to challenge the accuracy range at lower wavelengths, then light with higher wavelengths could be used. Also, the range of accuracy could be increased beyond one wavelength using known techniques for applying multiple heterodyne beams of different colors. All heterodyne beams 250 and the point light source 210 preferably originate from a common light source.

The processing disclosed above to capture of an image on the image sensor and produce the resulting wavefront map is performed by appropriate software stored on a computing platform, such as the hard drive of a stand alone computer, computer network and/or the Internet. The architecture of the platform and/or software is not critical, and all implantations are contemplated by the invention:

The following sections address the mathematical basis for the overview of the embodiments as set forth above. The following assumptions and conventions will be used:

It is assumed that the optic under inspection 205 is a single surface conjugate to the exit pupil which can impart a phase screen;

Pupil and autocorrelation space are coordinates (u,v);
A phase screen in the complex pupil is described by $\theta(u,v)$. This phase screen is the article of interest;
Image space (image sensor 250) coordinates (x,y);
Phase in image space $\phi(x,y)$;
The symbol for complex conjugation is *;
The flip that occurs in coherent transfer (pupil) space is ignored for mathematical clarity;
Going from the pupil plane to the image plane is approximated by a forward transform $\overset{F}{\Rightarrow}$ or $F\{\cdot\}$;
Going from the image to the pupil is approximated by an inverse transform $(\overset{F}{\Leftarrow})$ or $F^{-1}\{\cdot\}$
The symbol for a Fourier transform pair is $\overset{F}{\Leftrightarrow}$;
Assuming unit illumination of the optic under inspection the complex pupil of interest is defined as $$\text{Pupil}(u,v) = \text{Mask}(u,v)e^{i2\pi\theta(u,v)} \quad (1)$$

where Mask(u,v) is the binary (or shaded) real amplitude mask in pupil space and $\theta(u,v)$ is the phase screen applied to the pupil. For example, continuing with the mouse-shaped object under inspection 205, a mouse-shaped-shaped mask 910 is present in pupil space shown in FIG. 9A. The amplitude image formed by the test beam is then:

$$F\{\text{Pupil}(u,v)\} = A_2(x,y)e^{i2\pi\phi(x,y)}. \quad (2)$$

Figure 9A:
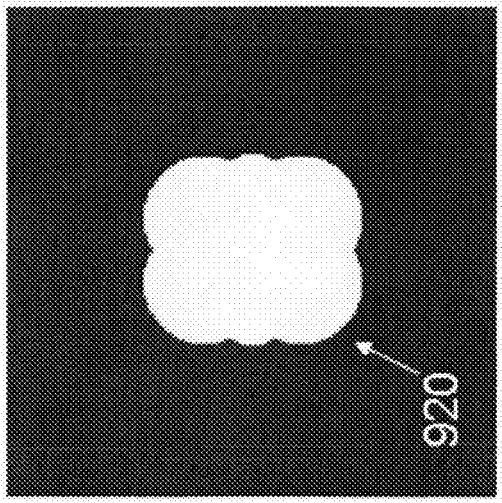
FIG. 9A shows an image of the object under inspection in pupil space.
Figure 9B:
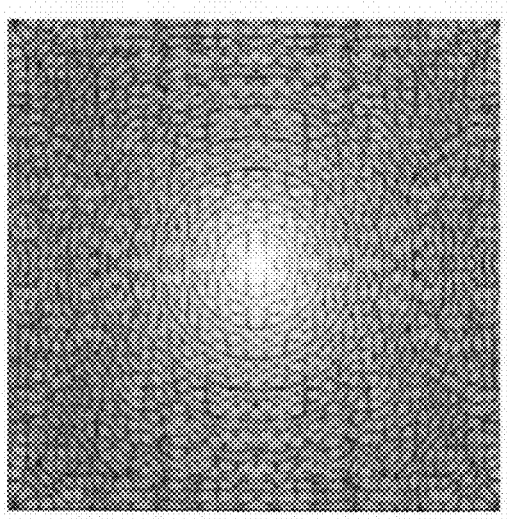
FIG. 9B shows as example of the diffraction limited image (in logarithmic scale) formed by the mask in FIG. 9A.
Figure 9C:
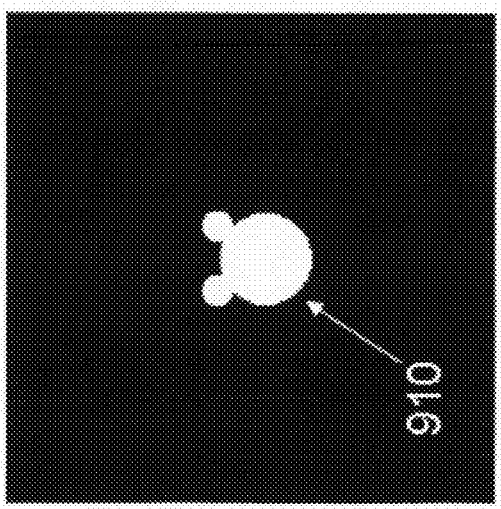
FIG. 9C shows the OTF mathematically stretched in order to highlight the silhouette of the OTF location.

FIG. 9B shows as example of the diffraction limited image (in logarithmic scale) formed by the mask in FIG. 9A. FIG. 9C shows the OTF mathematically stretched in order to highlight the silhouette of the OTF 920 location.

In image space the heterodyning beam is a plane wave with amplitude $A_1$ and due to the angle of arrival a linear phase. The Fourier transform of a tilted plane wave results is a displaced delta function in pupil space:

$$A_1 \partial(u \pm u_o, v) \overset{F}{\Leftrightarrow} A_1 e \overset{F}{\Leftrightarrow} i2\pi x u_o. \quad (3)$$

Figure 10C:
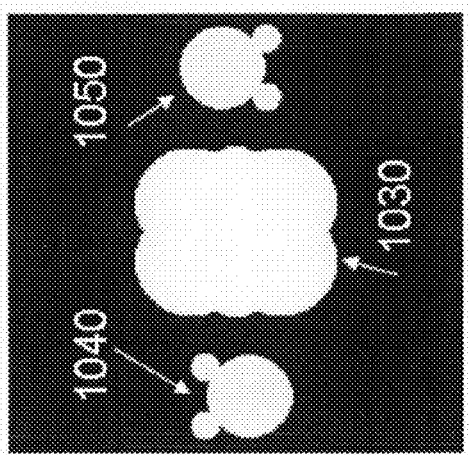
FIGS. 10A-10C show the effect of the addition of a heterodyne beam to the views shown in FIGS. 9A-9C.
Figure 10B:
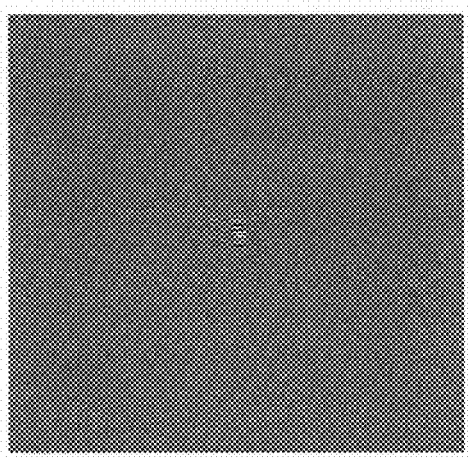
Figure 10A:
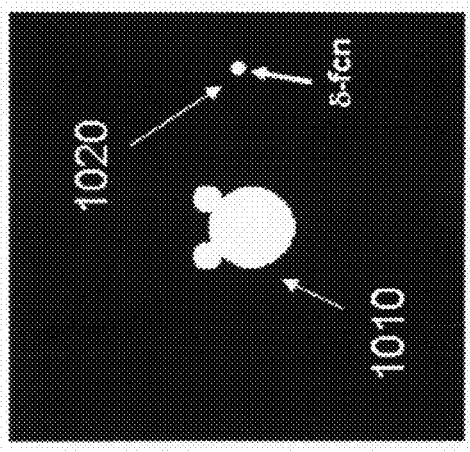

The separation $u_o$ in pupil space must be enough to avoid interference in the data. The addition of the heterodyning beam ($\delta$-fcn) in pupil space is shown in FIG. 10A-C (where the delta function is exaggerated for clarity). FIGS. 10A-C, $A_1$ and $A_2$ were set so that both "apertures" transmit equal amounts of light. FIG. 10A is an example of a binary mask 1010 with a single heterodyne beam 1020 (exaggerated for clarity) representing the heterodyning beam 250 in the pupil plane. FIG. 10B is the logarithmic stretch of the diffraction limited PSF due to that mask and $\delta$-fcn. FIG. 10C shows the OTF mathematically scaled to enhance the silhouettes. In addition to the OTF 1030, a silhouette of the exact pupil 1040 and a silhouette of its complex conjugate 1050 now appear as a result of the heterodyning beam 250.

The PSF resulting from the mask in FIG. 9B is similar in shape to that in FIG. 10B, but now displays fringing properties (although the fringes are so close together for the scale of FIG. 10B that they form a mostly uniform background). The difference is far more distinct in FIGS. 9C v. 10C, where the presence of heterodyne beam 250 generates an exact copy of the complex pupil to appear as a side lobe in the OTF. This can be seen as the silhouette of the mouse-shaped in pupil 1040. The side lobe associated with the silhouette of the complex conjugate 1050 of the complex pupil is also seen.

The embodiment of the present invention may be understood by considering the autocorrelation of FIG. 10A. It is illustrative to envision autocorrelation as the convolution of FIG. 10A with its complex conjugate. In this manner it is noted that when the $\delta$-fcn is sufficiently separated from the pupil mask, the convolution of the complex pupil and the delta function equals exactly the complex pupil. The convolution of the complex pupil with its conjugate gives the traditional OTF. Finally the complex conjugate δ-fcn convolves with the pupil yielding an exact copy of the conjugate of the complex pupil. There is no new information in the conjugate side lobe; other than a sign change and dimension flip in phase space it is exactly equal to the other side lobe.

Continuing with the mathematical derivation, the full description of the "OSHIFT" complex pupil is the addition of equations (1) & (3), $$OSHIFT\_Pupil(u,v) = A_1 \partial(u-u_o,v) + Mask(u,v)e^{i2\pi\theta(u,v)} \quad (4)$$

Given the Fourier pairs in equations (2) & (3) the intensity image is $$I(x,y) = |A_1 e^{i2\pi x u_o} + A_2(x,y) e^{i2\pi\phi(x,y)}|^2 \quad (5a)$$

$$I(x,y) = |A_1|^2 + |A_2(x,y)|^2 + A_1 A_2(x,y)(e^{i2\pi(\phi(x,y)-xu_o)} + e^{-i2\pi(\phi(x,y)-xu_o)}). \quad (5b)$$

The inverse Fourier transform of the intensity image is $$F^{-1}\{I(x,y)\} = F^{-1}\{|A_1|^2\} + F^{-1}\{|A_2(x,y)|^2\} + F^{-1}\{A_1 A_2(x,y)(e^{i2\pi(\phi(x,y)-xu_o)} + e^{-i2\pi(\phi(x,y)-xu_o)})\}. \quad (6)$$

The first two Fourier terms contribute, respectively, to the traditional OTF and a DC term associated with the δ-fcn intensity (the center image of FIG. 10C). The last Fourier term represents the OSHIFT side lobes resulting from the heterodyning beam. Given sufficient separation of the side lobes, these last terms do not interfere with the traditional OTF and are the terms of interest. Dropping the constant $A_1$, the transform of the side lobes may be re-written using equations (2) & (3)

$$F^{-1}\{A_2(x,y)(e^{i2\pi(\phi(x,y)-xu_o)} + e^{-i2\pi(\phi(x,y)-xu_o)})\} = Pupil(u-u_o,v) + Pupil^*(u+u_o,v) \quad (7)$$

The salient property of the mathematics is that an exact copy of the complex pupil (and its conjugate) appears in the Fourier transform of a single OSHIFT intensity image. Furthermore the information of interest, the wave front induced by a phase screen at the pupil, may be found by masking the region of interest and taking the arctangent $$\theta(u-u_o,v) = \text{Tan}^{-1}\left[\frac{\text{Im}[Pupil(u-u_o,v)]}{\text{Re}[Pupil(u-u_o,v)]}\right]. \quad (8)$$

Referring now again to FIGS. 7 and 8, assuming that the image sensor has a resolution of $d_p$ (e.g., a pixel pitch of a CCD, or granularity of film, etc.) the test beam has a wavelength of λ and converges at an f/# then the optical sampling factor is:

$$Q = \frac{f/\# \lambda}{d_p}. \quad (9)$$

It is further noted that the digital pupil width of a Q=M system is N/M pixels.

FIG. 8 combines scaling features contained in FIGS. 9A-C and 10A-C. In order to fit the OSHIFT side lobes within the digital Fourier transform of a captured image, the pupil is preferably ¼ of the total image size and the delta function is preferably displaced 1½ pupil widths from center. This corresponds to a digital sampling of Q=4 and angle of the heterodyning beam of 1.5/(f/#) as shown in FIG. 7.

If the OSHIFT intensity image is N×N pixels, its digital Fourier transform is also N×N pixels. FIG. 8A examines spacing issues shown in FIGS. 9A-C and 10A-C. The small circle 810 circumscribes the pupil whereas the larger circle 820—twice the diameter of the circle 810—circumscribes the OTF. The delta function (heterodyne beam 250), which occurs at the center of the rightmost silhouette, is shown as circle 830. This image may then be used to derive preferable but non-limiting "rules of thumb" to separate the OSHIFT side lobes:

The delta function must be at least 1½ pupil widths from the center;

N pixels must contain at least 4 pupil widths.

This second criteria above along with the statement below equation (9) says that a good rule of thumb is:

$$Q_{TestBeam} = 4 \quad (10)$$

Thus:

$$f/\#_{TestBeam} = 4\frac{d_p}{\lambda}. \quad (11)$$

The full angle associated with the marginal rays of the test beam is:

$$\theta_{marginal\_rays\_of\_TestBeam} \approx \frac{1}{f/\#}. \quad (12)$$

Since the angle in image space varies linearly with separation in pupil space; the heterodyne beam angle relative to the chief ray of the test beam is then:

$$\theta_{heterodyne} \approx \frac{1.5}{f/\#}. \quad (13)$$

Applicants note that the side lobes can be "pushed" into the corners of the image to allow for some latitude in the design or a smaller pupil size may be used.

Figure 11:
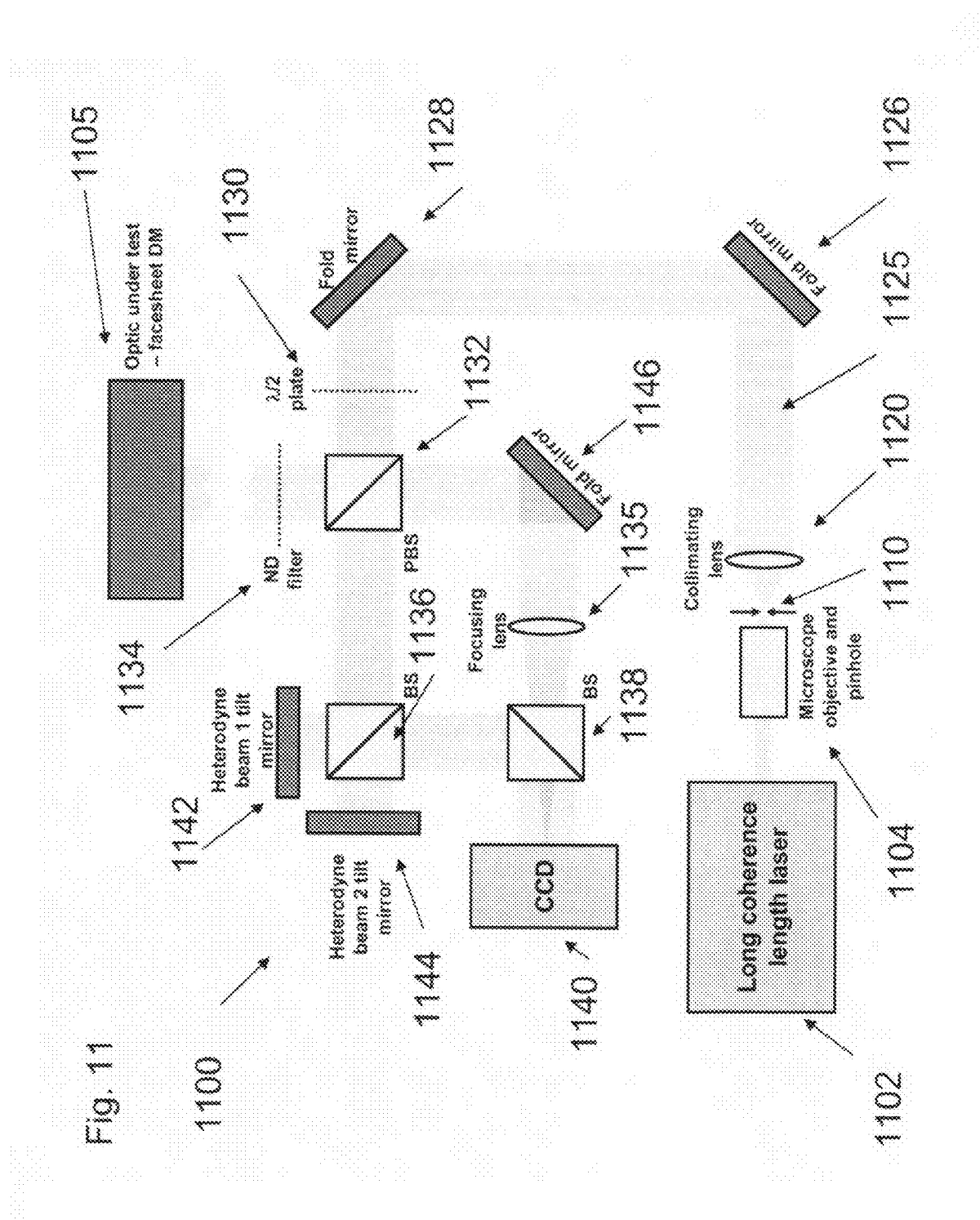
FIG. 11 shows an embodiment of an interferometer according to the invention.

Referring now to FIG. 11, an embodiment of an interferometer 1100 is shown. In this embodiment, interferometer 1100 utilizes two heterodyning beams. As discussed above, this will create two wavefront map/conjugate pairs in the phase image, which provides for data averaging and reduces phase unwrapping. The object under inspection 1105 is in this case a deformable mirror (DM).

Since the interferometer 1100 may be far from the optic under inspection 1105, a long coherence length laser 1102 (~10 m) is utilized. Laser light from laser 1102 passes through a microscope objective and pin hole 1104, thus forming a point of light source 1110. Spherical waves of light pass through a culminating lens 1120 and are converted into planar (flat) waves 1125 with an appropriate beam size to interrogate object under inspection 1105. Fold mirrors 1126 and 1128 are provided for space considerations, as they permit the embodiment to be mounted entirely inside a box that can be conveniently placed on an optical table.

Light beam 1125 then passes through a λ/2 plate 1130 before reaching a polarizing beam splitter (PBS) 1132. Both of these provide variation in the intensity ratio between the test and heterodyning beams (see step 520 above). After PBS 1132 the beam paths separate, independently interacting with an ND filter 1134, focusing lens 1135, beams splitters 1136 and 1138, image sensor 1140 (shown as a CCD), and first and second heterodyne beam tilt mirrors 1142 and 1144, and fold mirror 1146. The function of each is best described in the individual light pathways as set forth in FIGS. 12A-C.

Figure 12A:
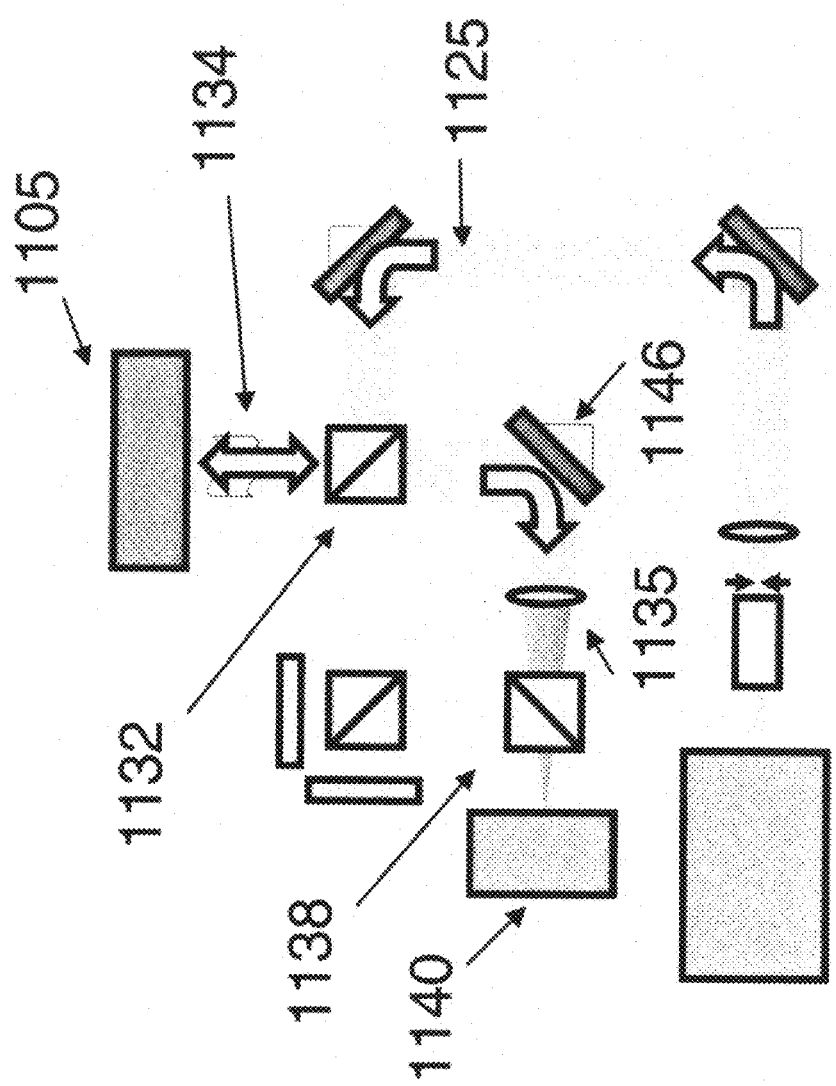
FIG. 12A shows a test beam pathway in the embodiment of FIG. 11.

FIG. 12A illustrates the transformation of part of light beam 1125 into a test beam for image sensor 1140. PBS 1132 partially reflects beam 1125 toward the object under inspection 1105, (in this case a reflective surface) passing through ND filter 1134 before passing through PBS 1132. Fold mirror 1146 reflects the beam in the direction of focusing lens 1135, which is designed to form a cone according to equation 11 above to create the image plane on image sensor 1140. The beam passes through 50/50 beam splitter 1138, where it is joined by two incoming heterodyne beams and incident on image sensor 1140.

Figure 12B:
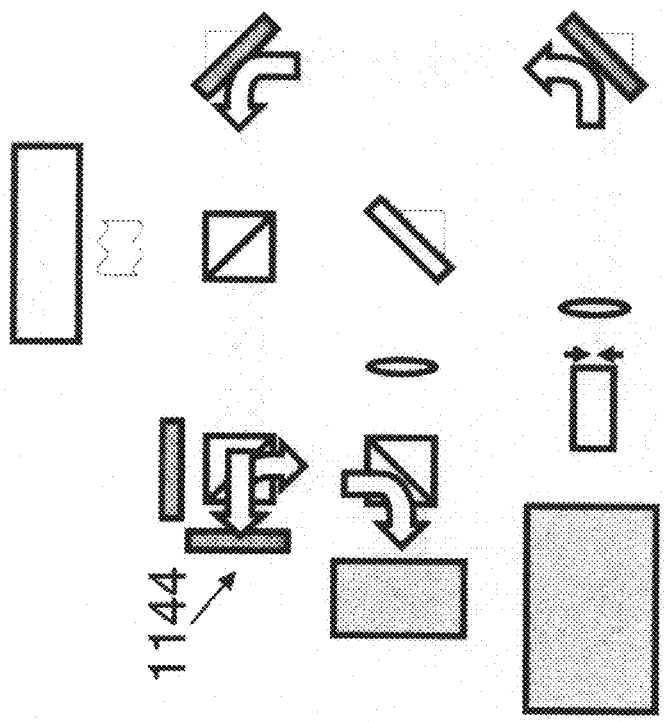
FIGS. 12B and 12C shows heterodyne beam pathways in the embodiment of FIG. 11.
Figure 12C:
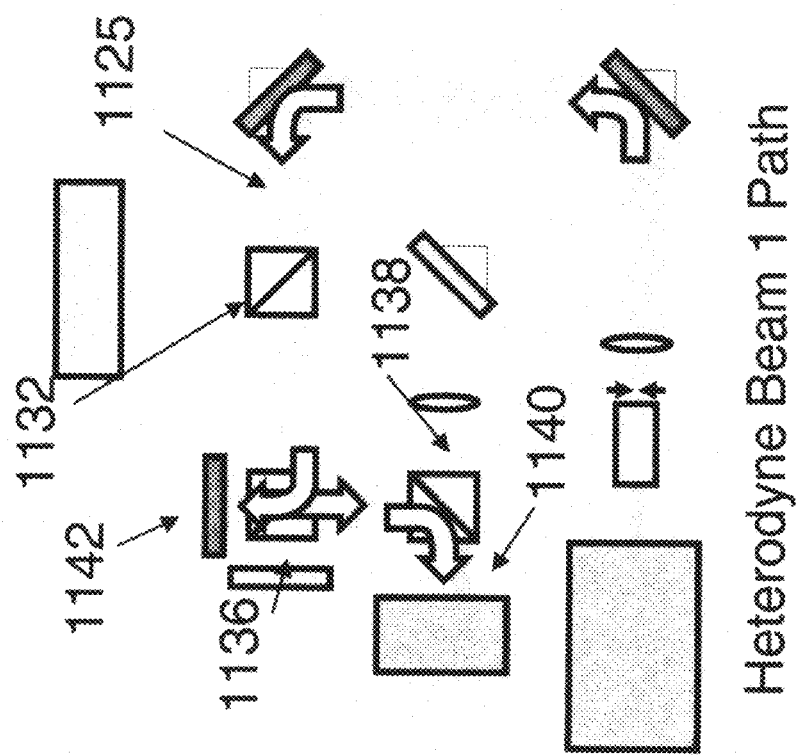

FIGS. 12B and 12C illustrate the creation of the two heterodyne beams. PBS 1132 partially transmits beam 1125 toward 50/50 beam splitter 1136. Beam splitter 1136 reflects 50% of light toward heterodyne beam 1 tilt mirror 1142, while the remaining light transmits toward heterodyne beam 2 tilt mirror 1144. (While mirrors 1142 and 1144 are shown in perpendicular alignment, they are actually at angles appropriate to properly position the heterodyne beams relative to image sensor 1140.) The heterodyne beams are created by the mirrors, and are recombined and directed to image sensor 1140 by beam splitters 1136 and 1138.

Figure 14C:
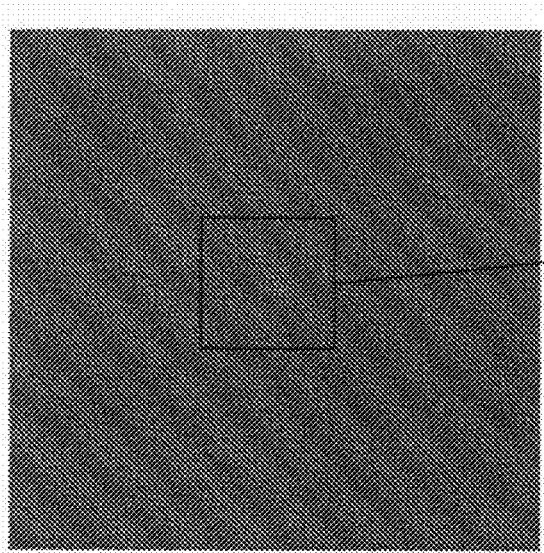
Figure 15:
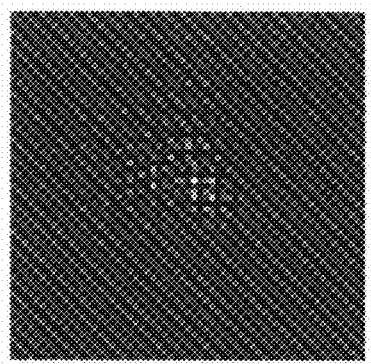
FIG. 15 is a blow up of FIG. 14C.
Figure 14B:
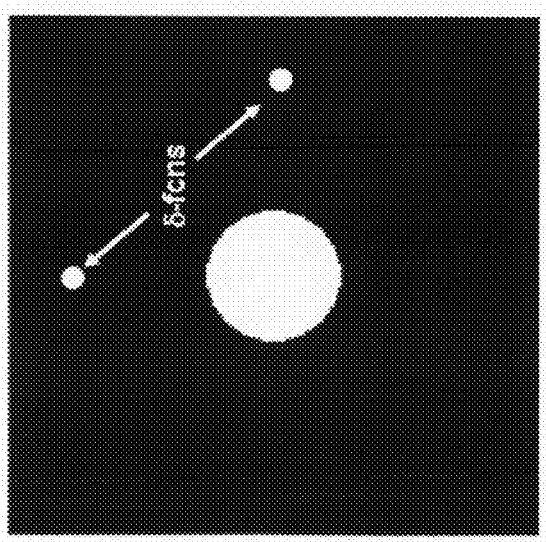
Figure 14A:
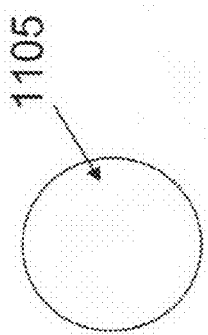

FIGS. 14A-14E show how the above interferometer 110 scans an object under inspection. In this non-limiting example, the object under inspection is a circular mirror 1105 as shown in FIG. 14A. For reference, FIG. 14B shows object 1105 and two heterodyne beams in pupil space, (although as discussed above the embodiment does not utilize that image). FIG. 14C shows the resulting image plane formed on image sensor 1140 (zoomed in for clarity in FIG. 15) for which interferometer 1110 takes a snapshot as discussed in step 510 above.

After image processing, the resulting phase image is shown in FIG. 14D. As discussed above, within the phase image are two (2) wave front maps 1420 of the object 1105 under inspection, two (2) complex conjugates 1430, and an phase transfer function ("FTF") 1440 (the phase of the OTF discussed previously). The two wave front maps can be combined to produce a final wave front map 1450 in FIG. 14E.

Figure 16:
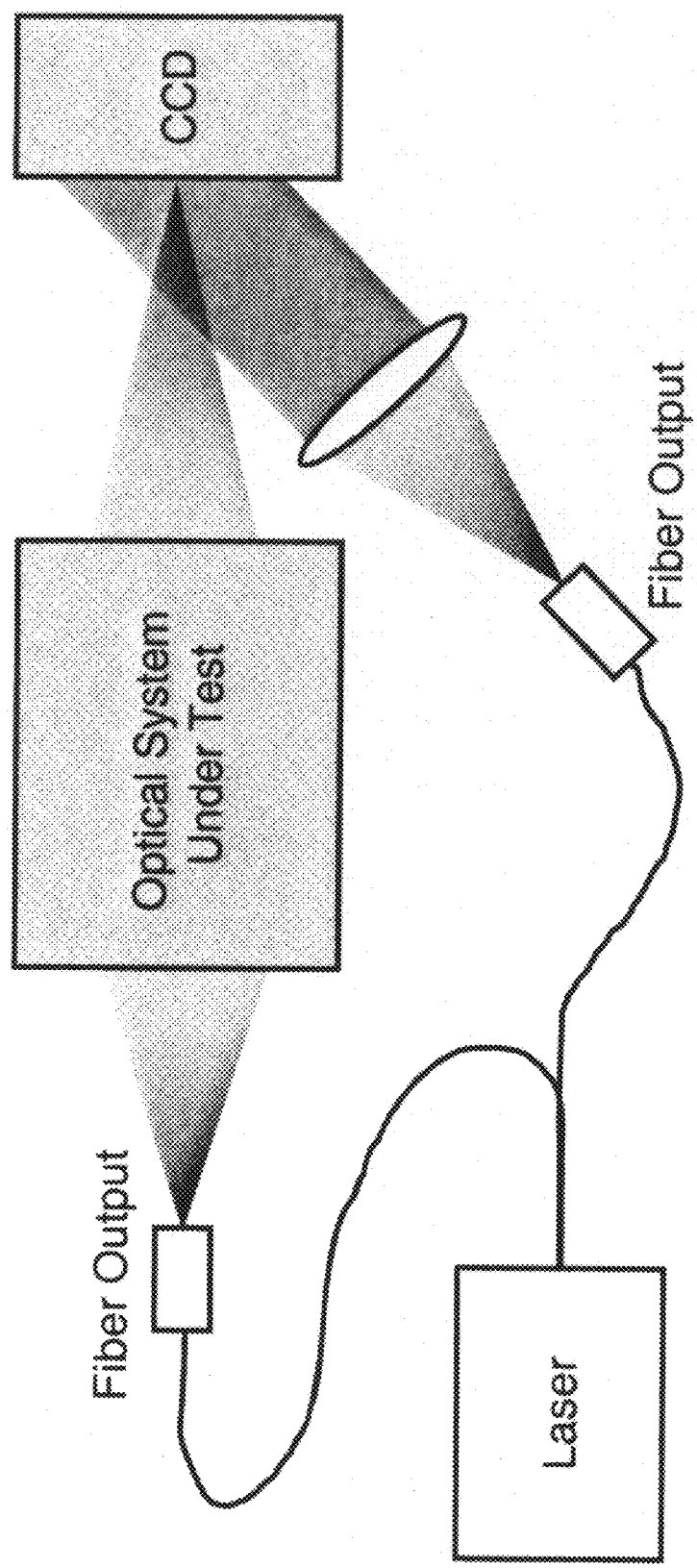
FIG. 16 shows another embodiment of an interferometer according to the invention.

FIG. 13 shows another embodiment of an interferometer, in which individual component parameters are provided. FIG. 16 shows yet another embodiment of an interferometer an in situ fiber. In this version one fiber interrogates an entire optical system. Near the image plane other fiber(s) are collimated and utilized as the heterodyning beam(s). This embodiment is useful for interrogating entire optical systems.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

I claim:

1. A method for interferometric analysis, comprising:
generating first and second light beams from a light source;
interacting the first light beam with an object under inspection;
forming, from light emanating from the object under inspection in response to the interacting, an image of the light source on an image sensor;
projecting the second light beam on the image on the image sensor, the combination of the light emanating from the object under inspection and the second light beam forming a collective image on the image sensor;
applying a Fourier transform to the collective image formed on the image sensor, thereby forming a phase image; and
isolating a wavefront map of the object under inspection from within the phase image.

2. The method of claim 1, further comprising:
said second light beam being at an angle to said first light beam.

3. The method of claim 2, wherein:
the angle is sufficiently large such that, within the phase image, the wavefront map of the image does not overlap with any other wavefront image; and
the angle is sufficiently small such that, within the phase image, the entire wavefront map of the image is within the phase image.

4. The method of claim 2, wherein the angle is such that, for a diameter of a circle that encloses the object under inspection in pupil space, then the source of the heterodyne beam is positioned in pupil space at a distance of 1.5 diameters from the center of the diameter of the object under inspection.

5. The method of claim 1, further comprising:
converting, between said generating and said projecting, the second light beam into at least one heterodyne light beam; and
said projecting comprises projecting the heterodyne light beam on the image on the image sensor.

6. The method of claim 5, further comprising:
said at least one heterodyne beam being at an angle to said first light beam.

7. The method of claim 6, wherein:
the angle is sufficiently large such that, within the phase image, the wavefront map of the image does not overlap with any other wavefront image; and
the angle is sufficiently small such that, within the phase image, the entire wavefront map of the image is within the phase image.

8. The method of claim 1, further comprising:
determining whether the captured image has sufficient coherency and fringe contract to differentiate fringe patterns from ambient noise.

9. The method of claim 1, wherein the image of the light source on the image sensor accounts for any modifications due to at least intervening optics between the light source and the image sensor.

10. A method for interferometric analysis, comprising:
generating first and second light beams from a light source;
interacting the first light beam with an object under inspection;
forming, from light emanating from the object under inspection in response to the interacting, an image of the light source on an image sensor;
converting, between said generating and said projecting, the second light beam into a plurality of heterodyne light beams;

projecting the heterodyne light beams on the image on the image sensor, the combination of the light emanating from the object under inspection and the heterodyne light beams forming a collective image on the image sensor; and applying a Fourier transform to the collective image formed on the image sensor, thereby forming a phase image containing at least a plurality of wavefront maps of the object under inspection;

isolating a plurality of wavefront maps of the object under inspection from within the phase image; and generating a final wavefront map of the object under inspection based on the plurality of wavefront maps.

11. The method of claim 10, further comprising:
each of said heterodyne light beams being at an angle to each other and to said first light beam.

12. The method of claim 10, wherein:
the angle is sufficiently large such that, within the phase image, the wavefront map of the image does not overlap with any other wavefront image; and
the angle is sufficiently small such that, within the phase image, the entire wavefront map of the image is within the phase image.

13. The method of claim 10, further comprising:
determining whether the captured image has sufficient coherency and fringe contract to differentiate fringe patterns from ambient noise.

14. The method of claim 10, wherein the image of the light source on the image sensor accounts for any modifications due to at least intervening optics between the light source and the image sensor.

15. An interferometer system configured to generate a wavefront map of an object, comprising:
a light source;
an image sensor;
an optical system configured to:
direct a first light beam from said light source onto the object;
direct light interacting with the object on said image sensor;
convert a second light beam from the light source into at least one heterodyne beam; and
direct the at least one heterodyne beam onto the image sensor;
the image sensor being disposed in the plane in which an image of said light source as modified by said optical system and said object will be in its best focus approximately preferably within plus or minus one depth of focus;
wherein the image of the light source and the heterodyne beams form a collective image on the image sensor.

16. The interferometer system of claim 15, further comprising a combination of software and hardware configured to:
apply a Fourier transform to the collective image formed on the image sensor, thereby forming a phase image;
isolate a wavefront map of the object under inspection from within the phase image.

17. The method of claim 16, said a combination of software and hardware being configured to determine whether the captured image has sufficient coherency and fringe contract to differentiate fringe patterns from ambient noise.

18. An interferometer system configured to generate a wavefront map of an object, comprising:
a light source;
an image sensor;
an optical system configured to:
direct a first light beam from said light source onto the object;
direct light interacting with the object on said image sensor;
convert a second light beam from the light source into a plurality of heterodyne beams; and
direct the plurality of heterodyne beams onto the image sensor;
the image sensor being disposed in the plane in which an image of said light source as modified by said optical system and said object will be in its best focus approximately within plus or minus one depth of focus;
wherein the image of the light source and the heterodyne beams form a collective image on the image sensor.

19. The interferometer system of claim 18, further comprising a combination of software and hardware configured to:
apply a Fourier transform to the collective image formed on the image sensor, thereby forming a phase image containing at least a plurality of wavefront maps of the object under inspection;
isolate a plurality of wavefront maps of the object under inspection from within the phase image;
generate a final wavefront map of the object under inspection based on the plurality of wavefront maps.

20. The method of claim 19, said a combination of software and hardware being configured to determine whether the captured image has sufficient coherency and fringe contract to differentiate fringe patterns from ambient noise.

* * * * *